US012706831B2

(12) United States Patent
Sundararajan et al.

(10) Patent No.: US 12,706,831 B2
(45) Date of Patent: Aug. 11, 2026

(54) SYMMETRIC NETWORKING TO CLOUD GATEWAY BASED ON DYNAMIC MAPPING OF ROUTE PREFERENCE INFORMATION

(71) Applicant: Cisco Technology, Inc., San Jose, CA (US)

(72) Inventors: Balaji Sundararajan, Fremont, CA (US); Michael Moskal, Germantown, TN (US); Satish Kumar Mahadevan, San Ramon, CA (US); Vivek Agarwal, Campbell, CA (US); Pradeep Kanavihalli Subramanyasetty, San Jose, CA (US); Prabahar Radhakrishnan, Dublin, CA (US); Samir Thoria, Saratoga, CA (US); Pritam Baruah, Fremont, CA (US); Samantha Misra, San Jose, CA (US); Shailendra Vinod Pardeshi, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/485,110

(22) Filed: Oct. 11, 2023

(65) Prior Publication Data

US 2025/0126045 A1 Apr. 17, 2025

(51) Int. Cl.
*H04L 45/02* (2022.01)
*H04L 45/122* (2022.01)

(52) U.S. Cl.
CPC ............ *H04L 45/04* (2013.01); *H04L 45/122* (2013.01)

(58) Field of Classification Search
CPC .............................. H04L 45/04; H04L 45/122
See application file for complete search history.

(56) References Cited

U.S. PATENT DOCUMENTS

2010/0284403 A1* 11/2010 Scudder .................. H04L 45/04 370/392
2018/0131604 A1* 5/2018 Zhou ....................... H04L 45/64
2021/0112034 A1* 4/2021 Sundararajan ........ H04L 47/125
2021/0306261 A1 9/2021 Duan et al.
2021/0328835 A1 10/2021 Mayya et al.
2022/0329477 A1 10/2022 Chiganmi et al.
2022/0417060 A1 12/2022 Sundararajan et al.
2023/0179543 A1 6/2023 Cidon et al.
2024/0154897 A1* 5/2024 Velayudhan ............ H04L 45/48

* cited by examiner

*Primary Examiner* — Jung H Park
(74) *Attorney, Agent, or Firm* — Polsinelli P.C.

(57) ABSTRACT

A process can include determining affinity information indicative of route preferences between branch routers and gateway routers. A prefix can be determined for a subnet of branch routers located at a same branch location. An affinity position of a first gateway router can be determined based on affinity information of the branch routers in the subnet. A mapping can be determined between a local preference Border Gateway Protocol (BGP) community attribute and the affinity position of the first gateway router, wherein a mapped local preference BGP community attribute and the affinity position are indicative of a same routing preference. The mapped local preference BGP community attribute can be attached to routes from the first gateway router into a cloud service provider. Affinity-based route preferences are indicated to the cloud service provider by redistributing the routes from the first gateway router with the mapped local preference BGP community attribute attached.

20 Claims, 9 Drawing Sheets

SYMMETRIC NETWORKING TO CLOUD GATEWAY BASED ON DYNAMIC MAPPING OF ROUTE PREFERENCE INFORMATION

TECHNICAL FIELD

The present technology generally relates to the field of computer networking, and more particularly, to systems and techniques for symmetric routing based on route preference in a Software-Defined Wide Area Network (SD-WAN).

BACKGROUND

Software defined networking (SD-WAN) was developed to provide various advantages over traditional Wide Area Networks (WANs). For instance, SD-WANs may provide methods for prioritizing critical network traffic and take advantage of Internet broadband connections to connect directly to multi-cloud resources. Further, SD-WANs may simplify the management of WAN fabrics with controller-first overlays that are independent of transport layers (e.g., MPLS, Ethernet, Internet, Long-Term Evolution (LTE) networks, 5G networks, etc.). SD-WAN controllers may be configured to choose among the available transport mediums to deliver optimal application performance as defined through service level agreements (SLAs).

In SD-WAN deployments, an SD-WAN controller is responsible for selecting and distributing overlay routes belonging to different address families (e.g., TRANSPORT routes, unicast routes, etc.) to edge network devices (e.g., edge routers, etc.). The SD-WAN controller learns of the routes attached to a first edge network device by receiving overlay management protocol (OMP) reports from the edge network device. The SD-WAN controller then selects a number of the routes attached to the first edge network device for distribution to second edge network devices in the SD-WAN. The SD-WAN controller selects a limited number of these routes at random, up to a configurable limit, called a send-path-limit.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
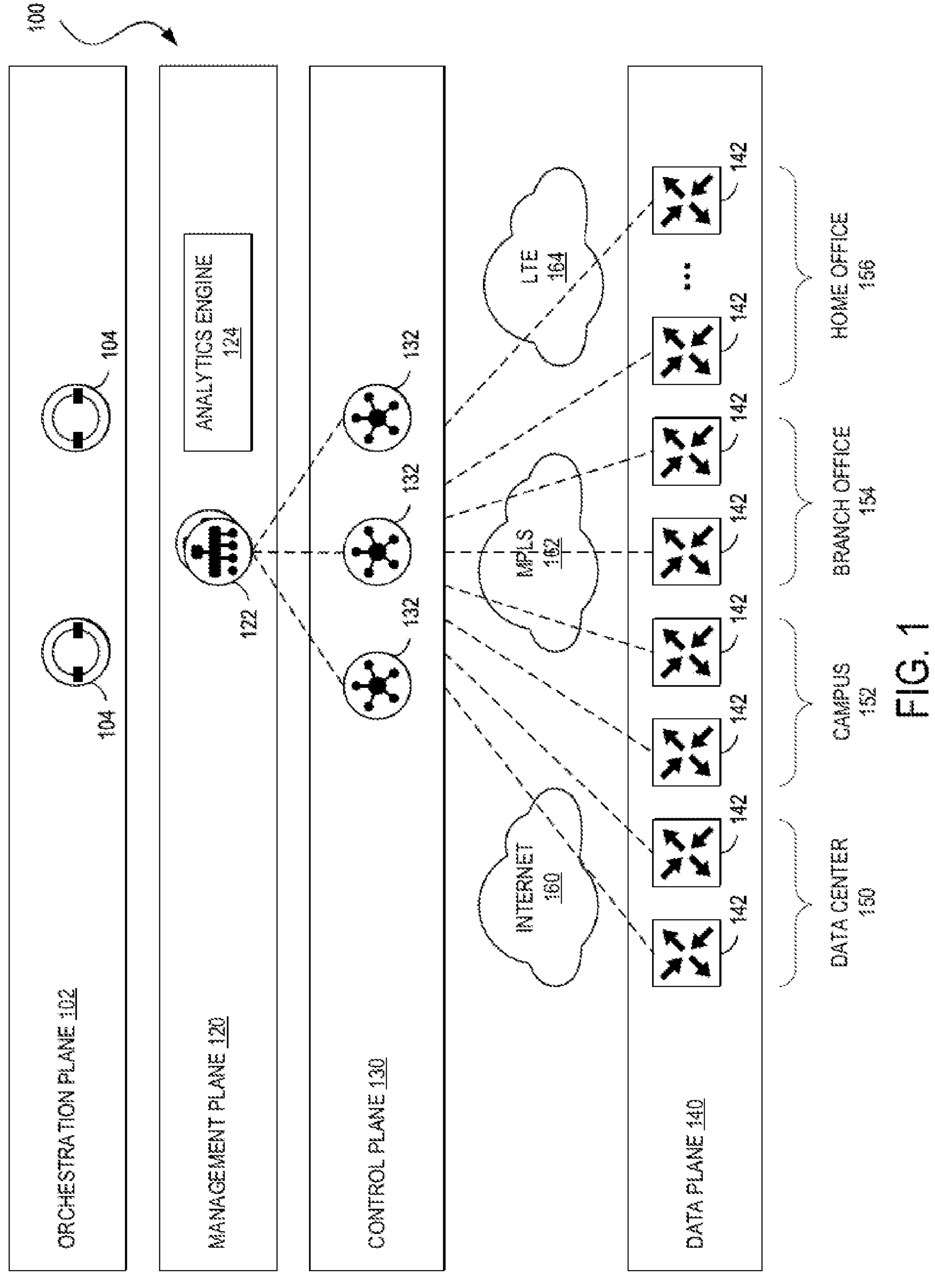
FIG. 1 illustrates an example of a network architecture for implementing aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for wireless communications. In one illustrative example, a method is provided, the method comprising: determining affinity information indicative of route preferences between a plurality of branch site routers and a plurality of gateway routers included in a first network; determining a prefix for a subnet of the first network, wherein the subnet includes one or more branch site routers of the plurality of branch site routers located at a same branch site location of the first network; determining an affinity position of a first gateway router included in the plurality of gateway routers, wherein the affinity position is determined based on affinity information corresponding to the one or more branch site routers included in the subnet at the same branch site location; determining a mapping between a local preference Border Gateway Protocol (BGP) community attribute and the affinity position of the first gateway router for the subnet of branch site routers, wherein a mapped local preference BGP community attribute and the affinity position are indicative of a same routing preference; attaching the mapped local preference BGP community attribute to routes from the first gateway router into a cloud service provider; and indicating, to the cloud service provider, the route preferences of the affinity information based on redistributing the routes from the first gateway router with the mapped local preference BGP community attribute attached.

In some aspects, the mapped local preference BGP community attribute and the affinity position of the first gateway router uniquely correspond to route preferences between the first gateway router and the one or more branch site routers included in the subnet associated with the determined prefix.

In some aspects, the mapped local preference BGP community attribute and the affinity position are indicative of the same routing preference comprising a rank of the first gateway router relative to the plurality of gateway routers In some aspects, the local preference BGP community attribute is a local preference BGP community tag.

In some aspects, the local preference BGP community attribute is selected from one of: a High preference route preference indication corresponding to a first BGP community; a Medium preference route preference indication corresponding to a second BGP community; or a Low preference route preference indication corresponding to a third BGP community.

In some aspects, the first BGP community corresponds to a 7224:7300 tag, the second BGP community corresponds to a 7224:7200 tag, and the third BGP community corresponds to a 7224:7100 tag.

In some aspects, respective affinity information is determined for each respective branch site router of the plurality of branch site routers; and the respective affinity information comprises affinity preference information indicative of a ranked order of route preferences between the respective branch site router and each of the plurality of gateway routers.

In some aspects, the plurality of branch site routers are located across a plurality of branch sites of the first network, and wherein the plurality of gateway routers are located across a plurality of direct connect locations of the cloud service provider.

In some aspects, the prefix is associated with a corresponding subset of the plurality of branch site routers, and wherein the subset comprises branch site routers at a same branch site location of the first network.

In another illustrative example, a system is provided, the system comprising: one or more processors; and one or more computer-readable storage media having computer-readable instructions stored thereon, wherein the computer-readable instructions, when executed by the one or more processors, cause the one or more processors to: determine affinity information indicative of route preferences between a plurality of branch site routers and a plurality of gateway routers included in a first network; determine a prefix for a subnet of the first network, wherein the subnet includes one or more branch site routers of the plurality of branch site routers located at a same branch site location of the first network; determine an affinity position of a first gateway router included in the plurality of gateway routers, wherein the affinity position is determined based on affinity information corresponding to the one or more branch site routers included in the subnet at the same branch site location; determine a mapping between a local preference Border Gateway Protocol (BGP) community attribute and the affinity position of the first gateway router for the subnet of branch site routers, wherein a mapped local preference BGP community attribute and the affinity position are indicative of a same routing preference; attach the mapped local preference BGP community attribute to routes from the first gateway router into a cloud service provider; and indicate, to the cloud service provider, the route preferences of the affinity information based on redistributing the routes from the first gateway router with the mapped local preference BGP community attribute attached.

In another illustrative example, one or more non-transitory computer-readable media are provided comprising computer-readable instructions, which when executed by one or more processors, cause the one or more processors to: determine affinity information indicative of route preferences between a plurality of branch site routers and a plurality of gateway routers included in a first network; determine a prefix for a subnet of the first network, wherein the subnet includes one or more branch site routers of the plurality of branch site routers located at a same branch site location of the first network; determine an affinity position of a first gateway router included in the plurality of gateway routers, wherein the affinity position is determined based on affinity information corresponding to the one or more branch site routers included in the subnet at the same branch site location; determine a mapping between a local preference Border Gateway Protocol (BGP) community attribute and the affinity position of the first gateway router for the subnet of branch site routers, wherein a mapped local preference BGP community attribute and the affinity position are indicative of a same routing preference; attach the mapped local preference BGP community attribute to routes from the first gateway router into a cloud service provider; and indicate, to the cloud service provider, the route preferences of the affinity information based on redistributing the routes from the first gateway router with the mapped local preference BGP community attribute attached.

Example Embodiments

The present technology addresses the need in the art for providing symmetric networking to a cloud gateway in software defined networking (SDWAN) deployments. For example, the present technology addresses the need to provide symmetric networking to a direct connect gateway of a virtual private cloud (VPC). The systems and techniques described herein can be used to implement an SDWAN controller that automatically maps between route preference information (e.g., affinity information) of a first network and Border Gateway Protocol (BGP) community tags of a second network. For instance, the first network can be an on-premises network and the second network can be a virtual private cloud (VPC) of a cloud service provider. The on-premises network and the VPC can be connected to an SDWAN. The SDWAN controller can be used to enable symmetric routing, wherein traffic between the on-premises network and the VPC utilizes the same routers on the outbound traffic leg and the inbound traffic leg (e.g., incoming and outgoing network traffic takes the same path or route in both directions The disclosure turns first to examples of network architectures and topologies for SDWANs, as well as various overlays for such networks. The disclosure subsequently discusses example embodiments for enabling symmetric routing in an SDWAN by automatically mapping between BGP community tags used by a first network to indicate path preference and affinity information used by a second network to indicate path preference. The disclosure then presents an example computing system which can be used to implement aspects of the present technology.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
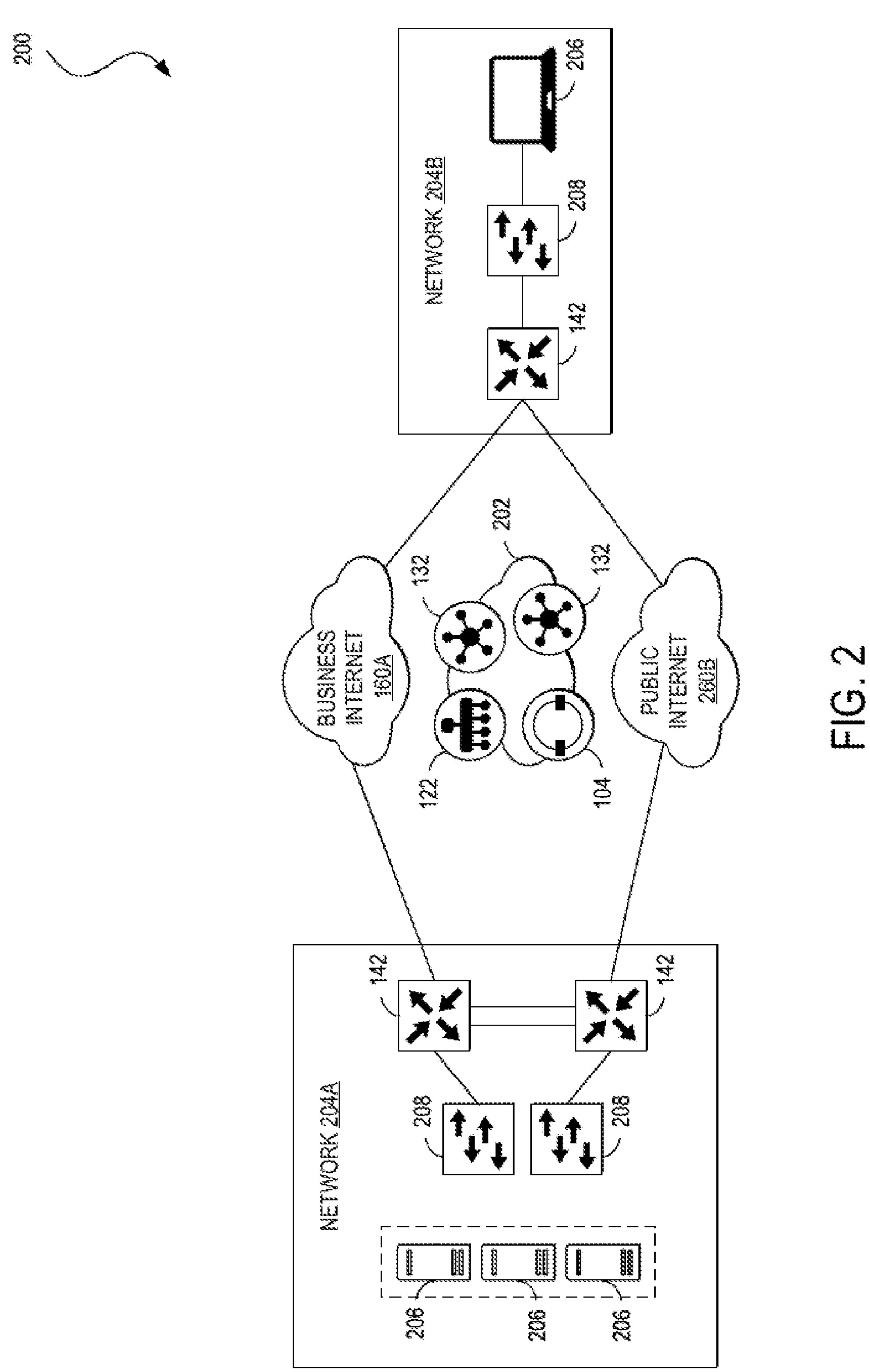
FIG. 2 illustrates an example of a network topology, in accordance with some aspects of the present technology.

FIG. 2 illustrates an example of a network topology 200 for showing various aspects of the network architecture 100. The network topology 200 can include a management network 202, network sites 204A and 204B (collectively "network sites 204" hereinafter) (e.g., the data center(s) 150, the campus network(s) 152, the branch office network(s) 154, the home office network(s) 156, cloud service provider network(s), etc.), and Internet transport networks 160A and 160B (collectively "Internet transport networks 160" hereinafter). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., MPLS, private1, biz-internet, metro-ethernet, LTE, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 5G, biz, internet, blue, bronze, custom1, custom2, custom3, default, gold, green, LTE, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
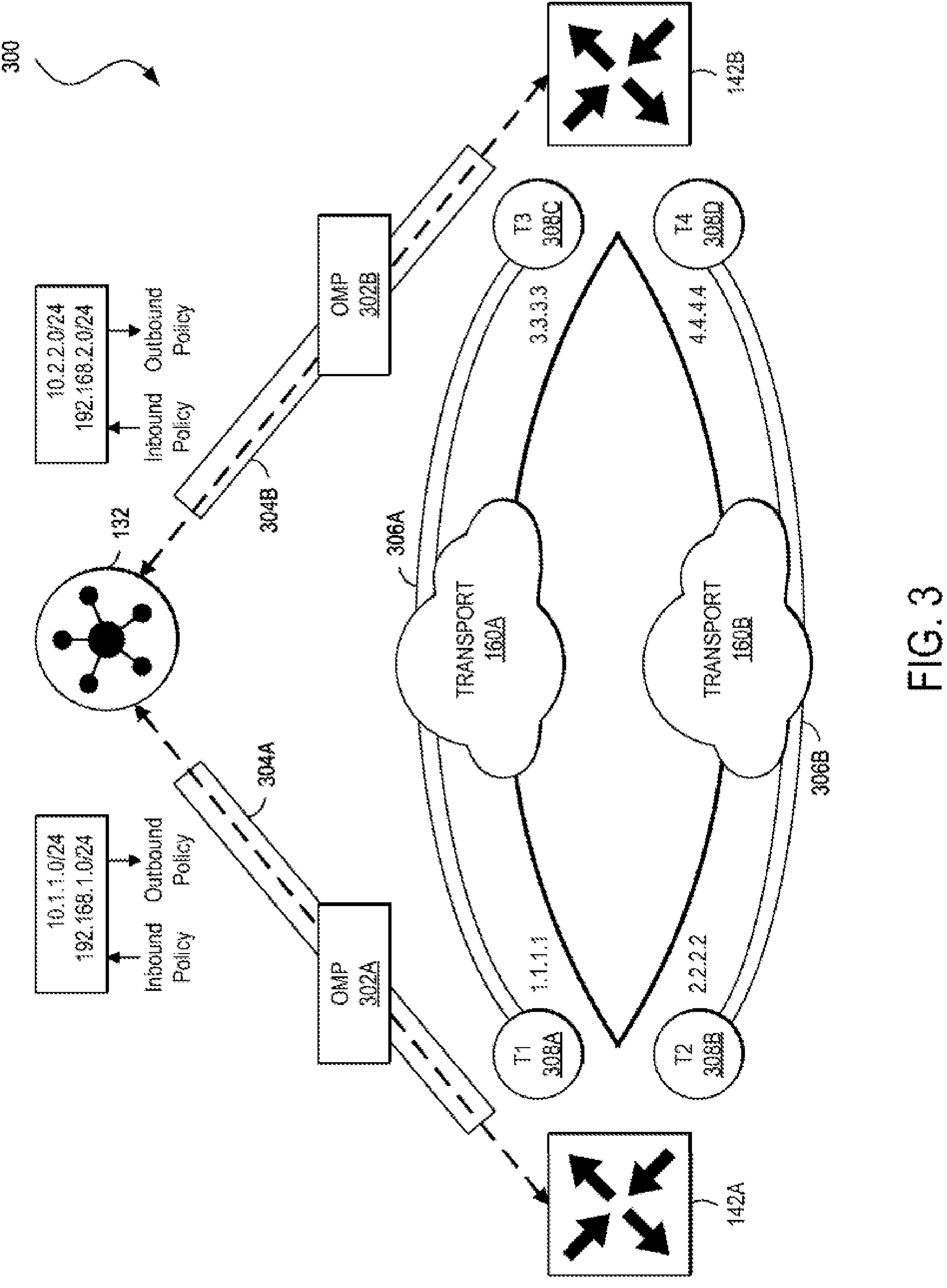
FIG. 3 is a diagram illustrating an example operation of a protocol for managing an overlay network, in accordance with some aspects of the present technology.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise various types of routes. For example, OMP can advertise OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can be similar to a BGP next-hop IP address) and other attributes such as origin, originator, preference, site identifier, tag, and virtual private network (VPN). An OMP route may be installed in the forwarding table if the TLOC to which it points is active.

In another example, OMP can advertise TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

In another example, OMP can advertise service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
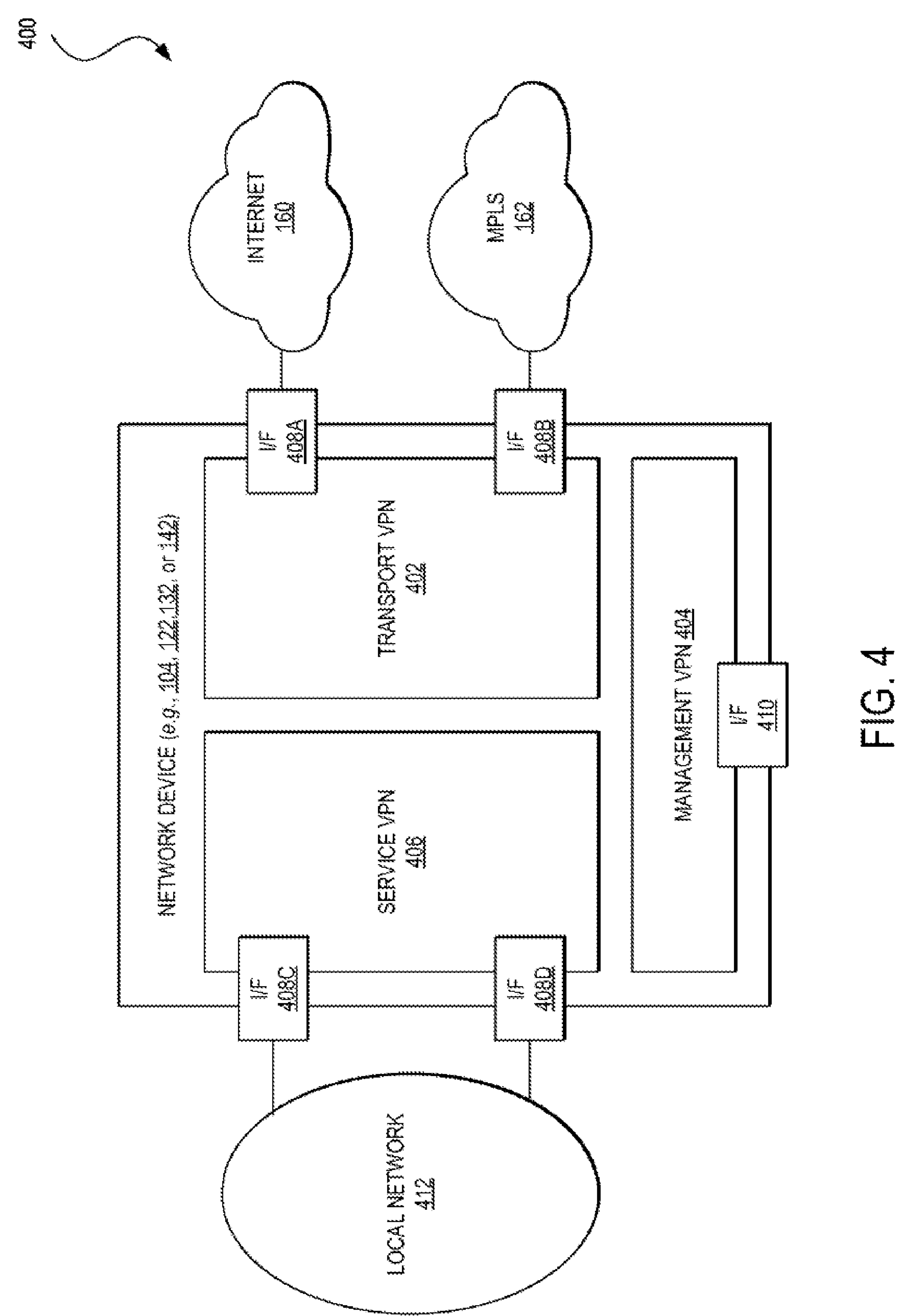
FIG. 4 is a diagram illustrating an example operation of virtual private networks for segmenting a network, in accordance with some aspects of the present technology.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively "network interfaces 410" hereinafter) are shown to be physical interfaces in this example, one of ordinary skill in the art will appreciate that the interfaces 410 in the transport and service VPNs can also be sub-interfaces instead.

Figure 5:
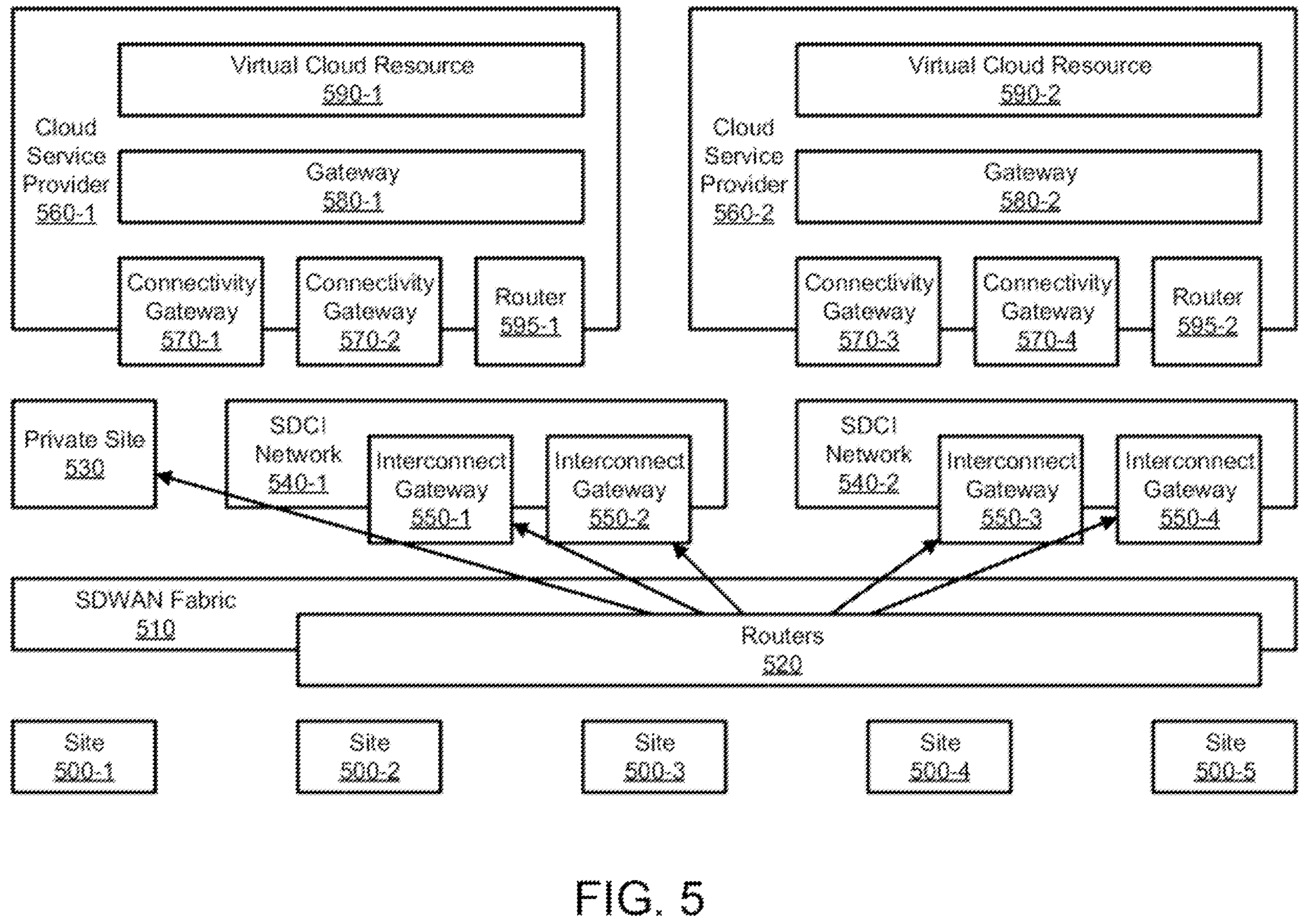
FIG. 5 illustrates an example network 500 including cloud infrastructure and on-premises sites, in accordance with some aspects of the present technology.

FIG. 5 illustrates an example network 500 including cloud infrastructure and on-premises sites. In one illustrative example, an SDWAN can be used to connect the cloud infrastructure with the on-premises sites, as will be described in greater detail below.

For example, sites 500-1, 500-2, 500-3, 500-4, 500-5 (collectively "sites 500" hereinafter) can be various on-premises branch sites for an entity such as an enterprise, and can be similar to campus 152, branch office 154, or home office 156 as illustrated in FIG. 1. Sites 500 can be connected to SDWAN fabric 510, which can contain routers 520. SDWAN fabric 510 can be the same as or similar to the networks 204A and 204B as illustrated in FIG. 2.

Routers 520 can connect sites 500 to private site 530 and/or SDCI networks 540-1 and/or 540-2 (collectively "SDCI networks 540" hereinafter) via interconnect gateways 550-1, 550-2, 550-3, 550-4 (collectively "interconnect gateways 550" hereinafter). Interconnect gateways 550 and connectivity gateways 570-1, 570-2, 570-3, 570-4 (collectively "connectivity gateways 570" hereinafter) can be routers or network edge devices. Interconnect gateways 550 can connect SDWAN fabric 510 to SDCI networks 540. Connectivity gateways 570 can connect SDCI networks 540 to cloud service providers 560-1 and 560-2 (collectively "cloud service providers 560" hereinafter).

In some examples, SDCI networks 540 can be software-defined cloud infrastructure networks. In some cases, SDCI networks 540 can be similar to networks 204A and 204B as illustrated in FIG. 2. SDCI networks 540 can act as intermediary networks between SDWAN fabric 510 and cloud service providers 560.

Cloud service providers 560 can include networks similar to networks 204A and 204B as illustrated in FIG. 2. Cloud service providers 560 can contain gateways 580-1 and 580-2 (collectively "gateways 580" hereinafter) and virtual cloud resources 590-1 and 590-2 (collectively "virtual cloud resources 590" hereinafter). Cloud service providers 560 can also be accessed by routers 595-1 and 595-2 (collectively "routers 595" hereinafter).

In some examples, the virtual cloud resources 590 can include virtual private networks hosted by a cloud network(s) and/or infrastructure associated with the cloud service providers 560. For example, in some cases, cloud service providers 560 can be Amazon Web Services (AWS), virtual cloud resources 590 can be virtual private clouds, and connectivity gateways 570 can be direct connect gateways. In some cases, the AWS cloud may utilize local preference information indications based on BGP community attributes, where the BGP community attribute(s) is indicative of path preference information for routes into and/or out of the AWS cloud. In another example, cloud service providers 560 can be Google Cloud, virtual cloud resources 590 can be virtual private clouds, and connectivity gateways 570 can be Google cloud routers. In some examples, the connectivity gateways 570 can be a partner interconnect (e.g., interconnection point or gateway, cloud interconnect, etc.) In some cases, the Google cloud may utilize local preference information indications based on BGP multi-exit discriminator (MED) configurations and/or MED values. For instance, the MED can be associated with one or more routes to and/or from the Google cloud, where the MED is indicative of path preference information for the respective routes into and/or out of the Google cloud. In another example, cloud service providers 560 can be Microsoft Azure, virtual cloud resources 590 can be virtual private clouds, and connectivity gateways 570 can be Azure interconnect points (e.g., Azure interconnect gateways, Azure cloud interconnects, etc.). IN some cases, the Microsoft Azure cloud may utilize local preference information indications based on path attributes (e.g., AS_PATH attributes). For instance, the AS-PATH attribute(s) can be associated with one or more routes to and/or from the Microsoft Azure cloud, where the AS_PATH attribute is indicative of path preference information for the respective routes into and/or out of the Microsoft Azure cloud.

Path redundancy may be implemented based on configuring connectivity between routers 520 and multiple interconnect gateways 550. In some examples, path redundancy can be established using private site 530. Path redundancy allows redundant paths to access workloads and/or resources based on site preferences, path attributes (e.g., AS_PATH attributes), border gate protocol (BGP) multi exit discriminator (MED) configurations, prefixes, control plane data, service level agreements, service constraints, network conditions, and/or other factors. Network redundancy may be implemented based on configuring connectivity between a first interconnect gateway 550 in a first SDCI network 540 and a first connectivity gateway 570, and then configuring connectivity between a second interconnect gateway 550 in a second SDCI network 540 and a second connectivity gateway 570. Network redundancy allows redundant SDCI networks 540 to access workloads through interconnect gateways 550 in different SDCI networks 540. Data center redundancy may be implemented based on configuring connectivity between multiple interconnect gateways 550 and connectivity gateway 570. Data center redundancy allows redundant sites 500 to access workloads through multiple interconnect gateways 550. Cloud redundancy may be implemented based on configuring connectivity from interconnect gateway 550 to multiple connectivity gateways 570 or routers 595. Cloud redundancy allows redundant virtual cloud resources 590 to access workloads through multiple connectivity gateways 570.

All of these connections can be dynamically configured and managed from the point of view of sites 500 using an orchestrator, such as Cisco vManage. Resources in the traffic path, including routers 520, interconnect gateways 550, and connectivity gateways 570, can be provisioned and managed by the orchestrator. Network administrators can manage and scale the number of redundant paths to their workloads based on demand or other factors. Collectively, this allows the orchestrator to manage path redundancy, network redundancy, data center redundancy, and cloud redundancy. Traffic paths can be determined based on prefix advertisement or BGP MEDs configured during the connection creation process. These connections can be end-to-end, configurable, scalable, and/or automated. For example, the orchestrator can be used to bring up a redundant connection in an automated manner. To illustrate, the orchestrator can instantiate multiple interconnect gateways 550 at different physical locations within an SDCI network 540 and/or across multiple SDCI networks 540, thereby enabling data center redundancy. The orchestrator can bring up an SDWAN tunnel between routers 520 and the instantiated interconnect gateways 550 running in SDCI network(s) 540. Preferences for any one of sites 500 can be set for each interconnect gateway 550. The orchestrator can provide interconnect gateways 550 and SDCI network(s) 540 locations where the SDCI underlay hands off to a cloud service provider 560 for any virtual cloud resource (VCR) tags corresponding to virtual cloud resources 590 which are to be connected to a site 500.

The orchestrator can internally automate the configuration of an underlay by creating virtual Layer 2 (L2) connections from the chosen interconnect gateways 550 to the SDCI handoff locations. A virtual interface can be created in an account associated with cloud service provider 560 as part of this operation. The orchestrator can create connectivity gateways 570 in an account for cloud service provider 560 along with other gateways 580 to access virtual cloud resources 590. The orchestrator can automate the routing by creating and managing routing tables for virtual cloud resources 590. To achieve intra-cloud redundancy, the orchestrator can automate the creation of connections between multiple connectivity gateways 570 and a virtual cloud resource 590. The orchestrator can internally associate the virtual interfaces created in an account associated with cloud service provider 560 to the created connectivity gateways 570. The orchestrator can configure a BGP session between interconnect gateways 550 and connectivity gateways 570. The BGP MED can be configured to dynamically choose a preferred path. The orchestrator can validate that the redundant connections are created successfully. At the end of this process, a network administrator or other agent operating at one of sites 500 can access virtual cloud resources 590 from site 500.

The orchestrator can also auto-scale connections to virtual cloud resources 590 within an SDCI network 540. To illustrate, the orchestrator can instantiate a new interconnect gateway 550 within a different physical location within an SDCI network 540. Given a set of existing connections to be replicated, the orchestrator can automate the connection replication from the new interconnect gateway 550 to virtual cloud resources 590. This replication process is similar to the process detailed above. The orchestrator can automatically monitor the health and state of connections throughout the systems illustrated in FIG. 5. If a link failure is noted, the orchestrator can attempt to reconcile the connection. It can also reconfigure a failed connection in response to a request.

As noted above, systems and techniques are provided herein that can be used to provide symmetric routing in an SDWAN by automatically mapping between Border Gateway Protocol (BGP) community tags (e.g., BGP local preference community tags) used by a first network to indicate path preference and affinity information used by a second network to indicate path preference.

Figure 6:
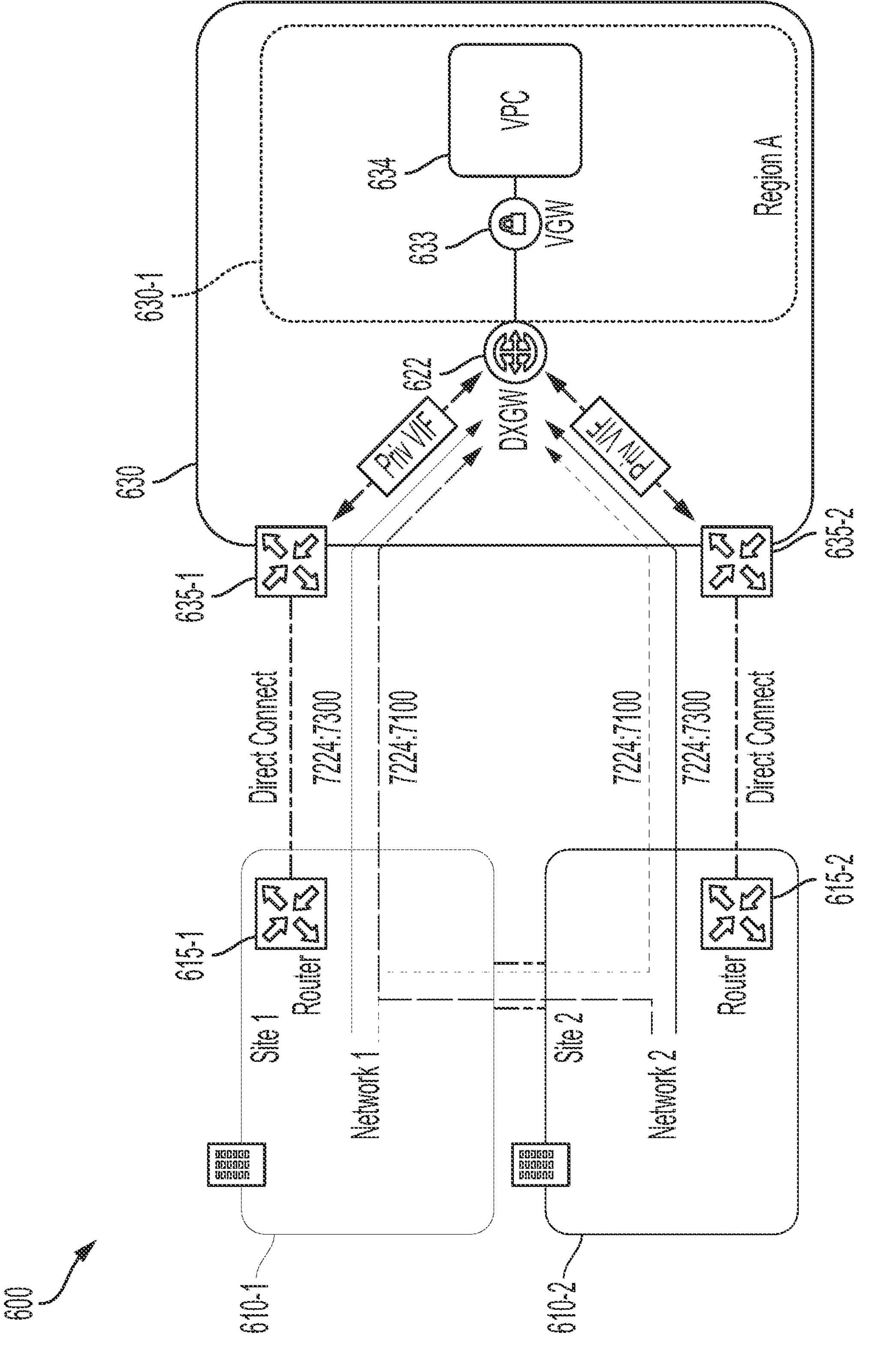
FIG. 6 illustrates examples of symmetric and asymmetric routing between on-premises branch sites and a virtual private cloud (VPC) associated with a software-defined wide-area network (SDWAN), in accordance with some aspects of the present technology.

FIG. 6 is a diagram illustrating examples of symmetric and asymmetric routing within an SDWAN deployment 600. SDWANs, or Software-Defined Wide Area Networks, have long been used to connect data centers and branch offices over the public internet. It has become desirable for these networks to also extend to the cloud. However, traditional SDWAN infrastructure is not always well suited for this task, which can increase the complexity and operational burden of using an SDWAN to provide a connection between one or more clouds (e.g., cloud service providers, cloud infrastructure, etc.) on one end and data centers, branch sites, on-premises infrastructure, etc., on the other.

As illustrated, the SDWAN deployment 600 can be used to interconnect each of at least a first branch site 610-1 and a second branch site 610-2 with a cloud service provider 630. More particularly, the first branch site 610-1 and the second branch site 610-2 can be interconnected with a direct connect (DX) gateway (DXGW) 622 associated with a virtual gateway (VGW) 633 of a virtual private cloud (VPC) 634. The VPC 634 can be provided by cloud infrastructure of the cloud service provider 630. In some embodiments, the VPC 634 can be associated with a respective region, such as a geographical region where the cloud service provider 630 provides cloud services. For instance, as illustrated in FIG. 6, the VPC 634 can be associated with a 'Region A' 630-1, which may be included in a plurality of different regions of the cloud service provider 630. Each cloud region of the cloud service provider 630 can include one or more corresponding VPCs, such as the VPC 634. In some examples, one or more (or both) of the first branch site 610-1 and the second branch site 610-2 may be located within or near the same geographic region as the 'Region A' 630-1 that hosts VPC 634 of the cloud service provider 630.

In some cases, a transit gateway can be used at the network edge to connect a customer's global network (e.g., associated with and/or including Network 1 of first branch site 610-1 and Network 2 of second branch site 610-2) to a cloud provider's backbone (e.g., cloud service provider 630). A direct connect gateway, such as DXGW 622, can be used to connect the customer network or data center (e.g., sites 610-1 and 610-2) to one or more VPCs hosted by a cloud provider (e.g., VPC 634 hosted by cloud service provider 630).

In one illustrative example, direct connect can be used to connect the branch sites 610-1, 610-2 to the cloud service provider 630. For instance, each of the branch sites 610-1, 610-2 can be linked to a direct connect location that collocates one or more customer routers with one or more cloud service provider routers. With the connection of the customer routers and cloud service provider routers at the direct connect location, a virtual interface is created to various services provided by the cloud service provider, and may be used to bypass internet service providers in the network path.

For instance, a first direct connect location may provide a connection between a first branch router 615-1 (of the first branch site 610-1 and corresponding Network 1) and a first cloud router 635-1, which may be collocated with one another at the first direct connect location (e.g., as illustrated by the upper 'Direct Connect' link in FIG. 6). A second direct connect location may provide a connection between a second branch router 615-2 (of the second branch site 610-2 and corresponding Network 2), which may be collocated with one another at the second direct connect location (e.g., as illustrated by the lower 'Direct Connect' link in FIG. 6).

In one illustrative example, a first private virtual interface (VIF) is created from Network 1 and the first branch router 615-1 (both associated with first branch site 610-1) to the cloud DXGW 622. A second private VIF is created from Network 2 and the second branch router 615-2 (both associated with second branch site 610-2) to the cloud DXGW 622. As noted previously, the cloud DXGW 622 can be associated with a transit gateway, in examples where there are multiple VPCs within the same cloud region (e.g., in examples where cloud region A 630-1 includes multiple VPCs 634). In other examples, the cloud DXGW 622 can be associated with a virtual gateway. A direct connect location can provide the branch sites 610-1, 610-2 with access to the cloud service provider 630 in the region with which the direct connect location is associated (e.g., in the context of the example of FIG. 6, the direct connect location(s) can be associated with the cloud service provider region A 630-1).

The cloud DXGW 622 is used to connect to a direct connect location in a particular region. In some aspects, a cloud DXGW (e.g., such as cloud DXGW 622) may be implemented as a globally available resource. For instance, cloud DXGW 622 can be used to connect to any region globally.

Each VPC of the cloud service provider 630 (e.g., such as VPC 634) has a corresponding virtual private gateway. For instance, the VGW 633 corresponds to VPC 634, in the example of FIG. 6. The VGW can be used to connect the VPC to the DXGW, for instance using a virtual private gateway association. In some embodiments, VGW 633 can be connected to DXGW 622 using a virtual private gateway association. The DXGW 622 can be connected to a first direct connect location (e.g., upper 'Direct Connect' shown in FIG. 6) using a corresponding first private VIF, and can be connected to a second direct location (e.g., lower 'Direct Connect' shown in FIG. 6) using a corresponding second private VIF. A direct connect connection links the first direct connect location to the customer data center/Network 1 at the first branch site 610-1; a different direct connect connection links the second direct connect location to the customer data center/Network 2 at the second branch site 610-2.

A plurality of different paths can exist between the customer routers 615-1, 615-2 and the cloud DXGW 622. For instance, because the Network 1 at first branch site 610-1 may be connected with the Network 2 at second branch site 610-2, the first branch site router 615-1 can reach the cloud DXGW 622 either through a first path that uses the first (e.g., upper) 'Direct Connect' location/link (e.g., 615-1→635-1→622), but may also reach the cloud DXGW 622 through a second path that uses the second branch site router 615-2 and the second (e.g., lower) 'Direct Connect' location/link (e.g., 615-1→615-2→635-2→622).

Similarly, the second branch site router 615-2 can reach the cloud DXGW 622 either through a first path that uses the second (e.g., lower) 'Direct Connect' location/link (e.g., 615-2→635-2→622), but may also reach the cloud DXGW 622 through a second path that uses the first branch site router 615-1 and the first (e.g., upper) 'Direct Connect' location/link (e.g., 615-2→615-1→635-1→622).

It may be desirable to assign different path preferences for reaching the cloud DXGW 622 from different branch routers and/or from different branch sites. As used herein, "path preferences" may be interchangeable with "route preference." For instance, the first branch site 610-1 and associated routers (e.g., first branch router 615-1) may designate the upper direct connect path as a primary path, shown in the example of FIG. 6 as the solid line between first branch site 610-1 and the cloud DXGW 622, and may designate the lower direct connect path as a secondary or backup path, shown in the example of FIG. 6 as the dashed line between first branch site 610-1 and the cloud DXGW 622.

Similarly, the second branch site 610-1 and associated routers (e.g., second branch router 615-2) may designate the lower direct connect path as a primary path, shown in the example of FIG. 6 as the solid line between second branch site 610-2 and the cloud DXGW 622, and may designate the upper direct connect path as a secondary or backup path, shown in the example of FIG. 6 as the dashed line between second branch site 610-2 and the cloud DXGW 622.

In the illustrative example of FIG. 6, all of the paths from the various customer routers (e.g., branch routers 615-1, 615-2 at sites 610-1, 610-2 respectively) terminate at the same cloud DXGW 634, but can take multiple different paths to and from cloud DXGW 622. In some examples, the presence of multiple different paths can result in asymmetric routing, for instance where traffic takes a first path from a branch site router to the cloud DXGW 622, but then takes a different return path back from cloud DXGW 622. In the context of connecting a customer network to a cloud infrastructure provider's DXGW associated with the customer's VPC, symmetric networking (also referred to as symmetric routing) is achieved when the same route is used for traffic from a customer router to the DXGW and for traffic from the DXGW to the customer router. Implementing and maintaining symmetric networking can be needed for stateful services, wherein the same router needs to see both sides of the network traffic (outgoing and incoming) or else the stateful service will break.

More generally, symmetric routing refers to the principle that packets should take the same path in both the forward and reverse directions between a source and destination. There is a particular need for symmetric routing in many SDWAN environments and deployments. For example, a benefit of SDWAN is its ability to perform intelligent path selection based on various metrics (e.g., latency, jitter, packet loss, etc.). Symmetric routing can therefore be used to ensure that the selected path attributes are consistent in both directions, by using the same path in both directions. Consistent path attributes can improve or otherwise make quality-of-service (QoS) delivered by the SDWAN more predictable, which can be of particular importance for various applications and use cases such as voice over IP (VoIP), video conferencing, etc. In such examples and use cases, asymmetric paths (e.g., asymmetric routing) with different path characteristics or attributes on the forward and reverse directions between the source and destination can lead to issues such as call quality degradation, packet reordering, etc.

Symmetric routing can also be needed for improved security. For instance, many advanced security features, such as stateful packet inspection and intrusion detection and prevention systems, rely on examining both incoming and outgoing packets to make an informed analysis and decision as to the presence of security threats or issues. Asymmetric routing can break the stateful nature of these security mechanisms, thereby making it difficult or impossible to track the state of a connection (and thereby weakening the security posture on the asymmetric routes and/or SDWAN). In another example, NAT services and firewall configurations within the SDWAN may often assume that the return path of a packet (e.g., a packet returning from VPC 634 to a respective customer router within the branch site 610-1, 610-2 that initiated a transmission to VPC 634) will traverse the same intermediate nodes as the forward path. Symmetric routing can ensure that this assumption taken by many NAT services and firewall configurations will hold true, and can therefore avoid potential network issues such as session termination due to NAT and/or firewall timeouts. There is a need to avoid session termination in SDWAN deployments that span across multiple branches and include cloud-based resources, where NAT services and firewalls are common.

In some approaches, a cloud service provider (e.g., cloud service provider 630) may support path preference indication mechanisms that can be used to achieve symmetric routing between a VPC (e.g., VPC 634) and respective routers within a particular customer branch site (e.g., 610-1, 610-2, etc.). For instance, cloud service provider 630 may support path preference indication using dedicated BGP community tags. In one illustrative example, cloud service provider 630 can support local preference BGP community tags to help control the route preference of traffic on private virtual interfaces (e.g., such as the private VIF between cloud router 635-1 and cloud DXGW 622, and/or the private VIF between cloud router 635-2 and cloud DXGW 622, etc.) and/or on transit virtual interfaces. In some cases, the cloud region 630-1 may otherwise determine a default routing for private and transit virtual interfaces, based on information such as the distance from the local region 630-1 to the direct connect locations. The dedicated BGP community tags can be used to modify this behavior based on assigning respective local preference communities to virtual interfaces.

The local preference BGP community tags can be used to achieve load balancing and route preference for incoming traffic to the customer network (e.g., return traffic from cloud 630/from VPC 634). For each prefix that is advertised over a BGP session, a community tag can be applied to indicate the priority of the associated path for returning traffic. For instance, in some examples, the cloud service provider 630 may support the following local preference BGP community tags:

7224:7100—Low preference
7224:7200—Medium preference
7224:7300—High preference

In some aspects, the path preference indication based on local preference BGP community tags (e.g., such as the low, medium, and high preference BGP community tags listed above) may be a non-standard implementation, in which case customers are often required to perform a cumbersome and error-prone manual configuration of route maps between their networks and the cloud DXGW 622 associated with the customer's VPC(s) 634. For instance, the path preference indication based on local preference BGP community tags (as implemented by the cloud service provider 630) can be incompatible with a different type of path preference indication used by the customer network associated with branch sites 610-1, 610-2. The customer network may use instead, for example, path preference indication(s) based on affinity information (e.g., OMP Affinity).

As noted previously, OMP (Overlay Management Protocol) is a protocol used in SDWAN deployments for establishing and maintaining the overlay network. One of the features of OMP is the ability to indicate route preference (e.g., path preference) through OMP Affinity. OMP Affinity is a mechanism that allows for the tagging of routes with specific attributes to indicate a preferred path for different types of traffic, and can be used in environments where multiple transport links exist between locations, where certain links are preferable for certain applications or types of data, etc. In some cases, affinity attribute information can be included in an OMP route advertisement, and may be used by a receiving device (e.g., a cloud router 635-1, 635-2) to make a determination of which return path to use for forwarding traffic. The use of affinity information can allow a finer level control over path selection, beyond that associated with the use of traditional metrics such as bandwidth, latency, cost, etc.

In some implementations, an SDWAN controller can be configured with policies that assign OMP Affinity tags to specific routes based on configuration information or application requirements, etc. The policies are then distributed to edge devices (e.g., customer branch site routers 615-1, 615-2), such that when an edge device receives a route advertisement containing an OMP affinity tag, the edge device uses the affinity information (along with other OMP attributes/affinity information and local policies) to populate its forwarding table with the most appropriate path for each type of traffic.

There is a need for systems and techniques that can be used to automatically map between affinity information used by a customer network and/or customer branch sites (e.g., 610-1, 610-2) and local preference BGP community tags used by a cloud service provider (e.g., 630) that hosts the customer VPCs 634.

In the absence of the presently disclosed solution, the complex and time-consuming manual configuration of route maps between customer networks (where path preference is based on Affinity information) and the DXGW 622 (where path preference is based on the three BGP community values High: 7224:7300, Medium: 7224:7200, Low: 7224:7100) is often performed, as there remains the need for symmetric networking into the cloud 630 and VPCs 634.

Accordingly, the systems and techniques described herein can be used to enable symmetric networking between a customer network using OMP affinity information for route preference indication, and a cloud service provider/VPC using local preference BGP community tags for route preference indication. The systems and techniques can eliminate the need to configure cumbersome and error-prone route maps manually for traffic symmetry in both directions.

Figure 7:
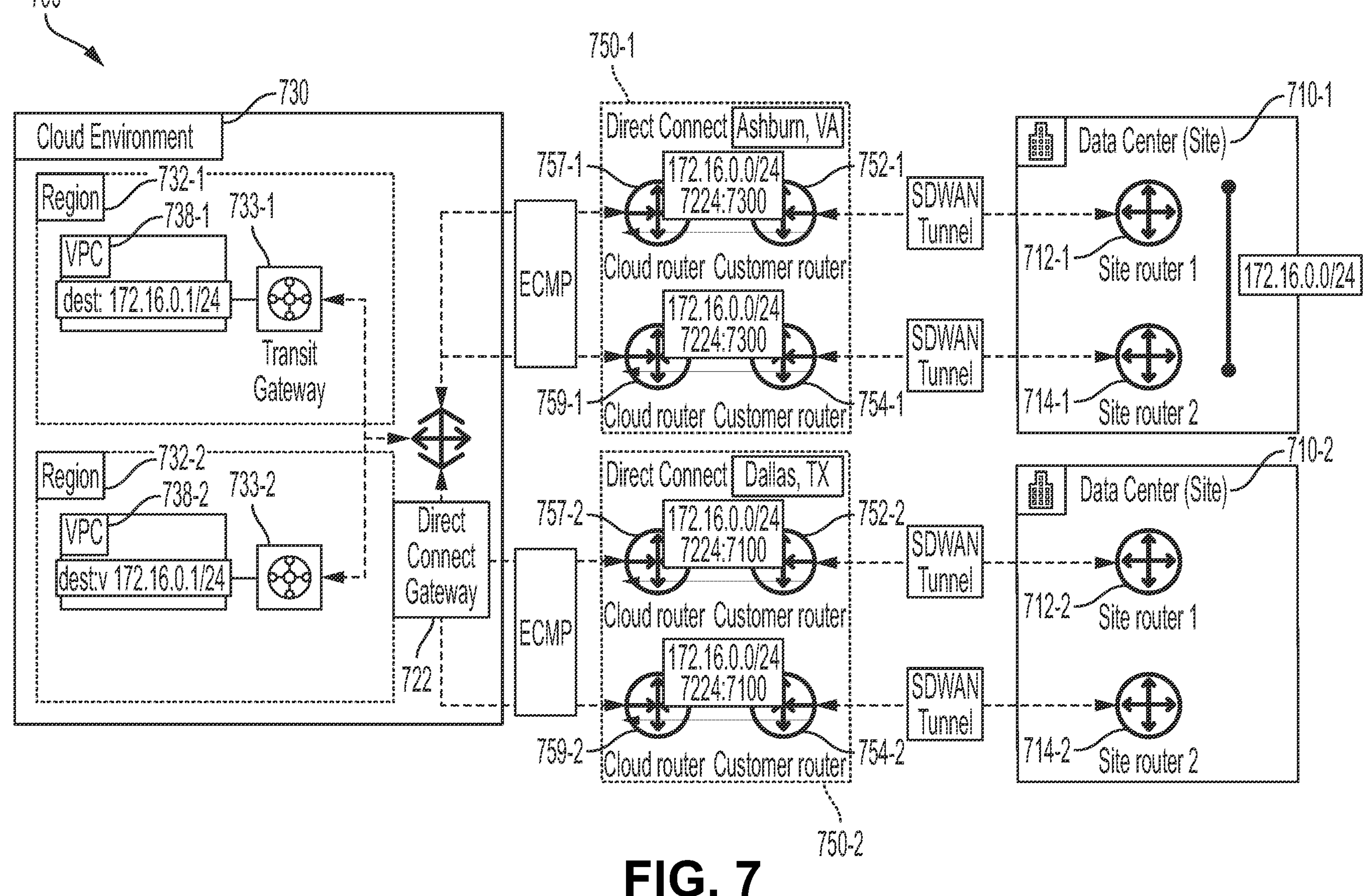
FIG. 7 illustrates additional examples of symmetric and asymmetric routing between on-premises branch sites and VPCs associated with a software-defined wide-area network (SDWAN), in accordance with some aspects of the present technology.

FIG. 7 illustrates an example SDWAN deployment 700 with symmetric routing between customer sites (e.g., data centers, branch sites, offices, etc.) 610-1, 610-2 and a cloud environment 730. In some aspects, the SDWAN deployment 700 of FIG. 7 can be the same as or similar to the SDWAN deployment 600 of FIG. 6. The cloud environment 730 can be the same as or similar to the cloud environment (e.g., cloud service provider) 630 of FIG. 6, and can include one or more direct connect gateways (DXGWs) 722 that are the same as or similar to the DXGW 622 of FIG. 6.

The cloud environment 730 can include one or more regions (e.g., a plurality of regions), shown here as the first region 732-1 and the second region 732-2, which may be the same as or similar to the region A 630-1 of FIG. 6. Each of first region 732-1 and second region 732-2 can include one or more VPCs, shown here as a first VPC 738-1 and a second VPC 738-2, respectively. The VPCs 738-1, 738-2 can be the same as or similar to the VPC 634 of FIG. 6. Each of the VPCs 738-1, 738-2 can be associated with a corresponding transit gateway 733-1, 733-2 respectively. In some embodiments, the transit gateways 733-1, 733-2 can be implemented as a virtual private interface (VIF) that is the same as or similar to the private VIFs of FIG. 6. In some cases, the transit gateways 733-1, 733-2 can be implemented as virtual gateways (VGWs) that are the same as or similar to the VGW 633 of FIG. 6.

The SDWAN deployment 700 can connect the cloud environment 730 to a customer environment (e.g., customer network) that includes one or more sites 710-1, 710-2 (which may be the same as or similar to the branch sites 610-1, 610-2 respectively, of FIG. 6). The sites 710-1, 710-2 may also be referred to as branch sites, data centers, customer sites, etc. Each branch site 710-1, 710-2 can include a plurality of customer routers (e.g., branch routers). For instance, the first site 710-1 can include the respective first site 1 router 712-1 and second site 1 router 714-1; the second site 710-2 can include the respective first site 2 router 712-2 and second site 2 router 714-2. The site routers (e.g., 712-1, 714-1, 712-2, 714-2) may be the same as or similar to one or more of the branch site routers 615-1, 615-2 of FIG. 6. The respective site routers of one of the customer sites 710-1, 710-2 can be associated with a respective range of IP addresses. For instance, the site 1 routers 712-1, 714-1 and other associated site 1 routers/devices may be aggregated under the IP addresses corresponding to the prefix 172.16.0.0/24. The site 2 routers 712-2, 714-2 can be aggregated under a different range of IP addresses corresponding to a different prefix than the site 1 routers 712-1, 714-1.

Each customer site 710-1, 710-2 can be connected to the cloud environment 730 by a respective direct connect location 750-1, 750-2 (respectively). The direct connect locations 750-1, 750-2 can be the same as or similar to the direct connect locations described previously above with respect to FIG. 6 (e.g., the upper and lower 'Direct Connect' branches of FIG. 6). Each of the direct connect locations 750-1, 750-2 can be associated with a different geographical location or region. For instance, the first direct connect location 750-1 is shown in FIG. 7 as corresponding to an Ashburn, VA location or region, while the second direct connect location 750-2 is shown in FIG. 7 as corresponding to a Dallas, TX location or region.

Each site router at a respective one of the customer sites 710-1, 710-2—if configured as an edge device for connecting to the direct connect location 750-1, 750-2 and cloud environment 730—may establish its own respective SDWAN tunnel to the corresponding direct connect location. As described previously above, the direct connect locations 750-1, 750-2 can provide colocation or private data centers etc., for connecting the customer network associated with customer sites 710-1, 710-2 to the cloud environment 730. For instance, first direct connect location 750-1 can collocate and/or connect a customer direct connect router 752-1 (corresponding to the SDWAN tunnel to first site 1 router 712-1) to a cloud direct connect router

757-1, and can additionally collocate and/or connect a customer direct connect router 754-1 (corresponding to the SDWAN tunnel to second site 1 router 714-1) to a cloud direct connect router 759-1.

Similarly, second direct connect location 750-2 can collocate and/or connect a customer direct connect router 752-2 (corresponding to the SDWAN tunnel to first site 2 router 712-2) to a cloud direct connect router 757-2, and can additionally collocate and/or connect a customer direct connect router 754-2 (corresponding to the SDWAN tunnel to second site 2 router 714-2) to a cloud direct connect router 759-2. The connection from the respective cloud direct connect routers (e.g., 757-1, 759-1, 757-2, 759-2) on to the cloud direct connect gateway 722 can be as described previously above with respect to the direct connect locations and DXGW 622 of FIG. 6.

In one illustrative example, the cloud environment 730 (e.g., including the cloud DXGW 722 and cloud direct connect routers (e.g., e.g., 757-1, 759-1, 757-2, 759-2) may support path/route preference indication only through the non-standard implementation based on local preference BGP community tags (e.g., High: 7224:7300, Medium: 7224:7200, Low: 7224:7100). The customer network (e.g., including the customer data centers/branch sites 710-1, 710-2 and the customer direct connect routers 752-1, 754-2, 752-2, 754-2) may support path/route preference indication only through OMP Affinity-based implementations, or other implementations based on using affinity information.

Accordingly, the systems and techniques described herein can be used to provide automatic mapping and/or translation between the route preference indication carried by assigned affinity information associated with customer routers of the customer network, and the local preference BGP community tags used by the cloud environment 730 and cloud routers to indicate route preference.

As used herein, the respective customer routers provided at the customer data centers/sites 710-1, 710-2 are collectively referred to as "site routers 712" or "branch routers 712," which may be used interchangeably to refer to any combination of one or more of the individual routers 712-1, 714-1, 712-2, 714-2, etc.

The respective customer routers provided at the direct connect locations 750-1, 750-2 are collectively referred to as "customer direct connect routers 752" or "customer DX routers 752," which may be used interchangeably to refer to any combination of one or more of the individual routers 752-1, 754-1, 752-2, 754-2, etc.

The respective cloud service provider routers provided at the direct connect locations 750-1, 750-2 are collectively referred to as "cloud direct connect routers 757" or "cloud DX routers 757," which may be used interchangeably to refer to any combination of one or more of the individual routers 757-1, 759-1, 757-2, 759-2, etc.

In some embodiments, the customer network associated with branch sites 710-1, 710-2, site routers 712, and customer DX routers 752 implements route preference indication and symmetric networking based on affinity information (e.g., also referred to as affinity preference, affinity indication, OMP affinity, etc.). For example, each respective site router included in the plurality of customer site routers 712 can be assigned affinity preference information indicative of the customer router's corresponding routing preference order of the different DX customer routers included in the plurality of customer DX routers 752. For instance, each one of the customer site routers 712 can be configured with affinity preference information comprising a ranked order of the plurality of customer DX routers 752 at the different direct connect locations 750-1, 750-2. A higher ranked customer DX router 752 in the affinity preference information has a higher routing/path preference to and from the customer site router 712 corresponding to the affinity preference information. In some implementations, each customer site router 712 can be configured with (e.g., can store, maintain, update, etc.) a corresponding affinity-preference-order information, indicating an affinity position of the DX customer routers. The affinity-preference-order information can be based on OMP Affinity attributes or information, etc.

A Router Affinity (e.g., router affinity information) is assigned on each respective one of the customer DX routers 752 provided at the direct connect locations 750-1, 750-2. The router affinity information can be determined based on the respective affinity preference information of each of the customer site routers 712 (and the respective affinity preference information for the customer site routers 712 can be assigned on the customer site routers 712 themselves).

Each respective DX customer router of the plurality of DX customer routers 752 can learn prefixes from the customer branch sites 710-1, 710-2 and/or from the customer site routers 712. In one illustrative example, the DX customer routers 752 can be configured to automatically map the learned prefixes (and corresponding affinity preference information thereof) to the local preference BGP community values supported by the cloud environment 730. Symmetric routing can be achieved by propagating customer site traffic from the customer site routers 712 with the translated/automatically mapped local preference BGP community values into the cloud DX routers 757 and beyond into the cloud DXGW 722 and cloud environment 730.

For instance, when a prefix is learned from a particular branch/DC customer router included in the plurality of customer site routers 712, the customer DX router 752 can determine its affinity position in the affinity-preference-order of the particular customer site router 712. The learned affinity position of the customer DX router 752 can then be automatically mapped into one of the three local preference BGP community values (e.g., tags) supported by the cloud service provider 730 (e.g., High: 7224:7300, Medium: 7224:7200, Low: 7224:7100). In particular, rather than mapping the learned prefix for the customer branch site router IP addresses to OMP Affinity, the customer DX router 752 can map the learned prefix to one of the three local preference BGP community tags.

This auto-mapped community is attached to the routes from the DX customer routers 752 when the routes are redistributed into BGP (e.g., routes from the respective ones of the plurality of DX customer routers 752 and into the cloud environment 730/to the cloud DXGW 722 for the VPCs 738-1, 738-2). Accordingly, the cloud provider 730 internal routers have an automatic way of knowing which of the DX customer routers 752 to prefer (and use) for the return traffic, such that symmetric network is implemented, achieved, and/or enforced.

For example, referring to the example of FIG. 7, the prefix 172.16.0.0/24 corresponds to a subnet within the customer network at data center/branch site 710-1. The 172.16.0.0/24 subnet includes up to 256 IP addresses and 254 different hosts/devices. Because the 172.16.0.0/24 prefix corresponds to a single subnet within the same customer data center/branch site 710-1, traffic to and from the cloud DXGW 722 and VPCs 738-1, 738-2 can be routed using the same preference information for each of the unique IP addresses and hosts/devices within the prefix 172.16.0.0/24.

For instance, the 172.16.0.0/24 prefix can be learned by one or more (or all) of the DX customer routers 752 at the different direct connect locations 750-1, 750-2. Each DX customer router 752 can map the 172.16.0.0/24 prefix to one of the three local preference BGP community values, based on the respective DX customer router's corresponding affinity position in the affinity-preference-order of the branch/DC customer routers 712 at datacenter 1 (e.g., site 710-1, where the 172.16.0.0/24 subnet is located).

In particular, the two DX customer routers 752-1, 754-1 located at the first direct connect location 750-1 (e.g., Ashburn, VA location/region) can tag the learned 172.16.0.0/24 prefix for customer site 710-1 with the High Preference BGP community value 7224:7300, based on the Ashburn, VA customer DX routers 752-1, 754-1 being at the first (or top third) affinity position in the affinity-preference-order of the customer site 1 routers 712-1, 714-1 located at the first customer data center/site 710-1. This automatic mapping is illustrated for the first direct connect location 750-1 in FIG. 7 as the mapping between learned prefix 172.16.0.0/24 to local preference BGP community tag 7224:7300, representing the attachment of the auto-mapped high-preference community to the routes from the Ashburn, VA DX customer routers 752-1, 754-1 that are redistributed into BGP (e.g., to the cloud DX routers 757-1, 759-1, respectively) for traffic originating at one of the customer site 710-1 routers 712-1 or 714-1.

The two DX customer routers 752-2, 754-2 located at the second direct connect location 750-2 (e.g., Dallas, TX location/region) can tag the learned 172.16.0.0/24 prefix for customer site 710-1 with the Low Preference BGP community value 7224:7100, based on the Dallas, TX customer DX routers 752-2, 754-2 being at the last (or bottom third) affinity position in the affinity-preference-order of the customer site 1 routers 712-1, 714-1 located at the first customer data center/site 710-1. This automatic mapping is illustrated for the second direct connect location 750-2 in FIG. 7 as the mapping between learned prefix 172.16.0.0/24 to local preference BGP community tag 7224:7100, representing the attachment of the auto-mapped low-preference community to the routes from the Dallas, TX DX customer routers 752-2, 754-2 that are redistributed into BGP (e.g., to the cloud DX routers 757-1, 759-1, respectively) for traffic originating at one of the customer site 710-1 routers 712-1 or 714-1.

A similar automatic mapping of learned prefixes can be performed by the plurality of customer DX routers 752 for the learned prefixes and affinity-preference-order affinity preference information of the second customer data center/site 710-2 customer routers 712-2, 714-2 (e.g., learned prefixes for the site 2 routers 712-2, 714-2 can be mapped to the High route preference BGP community tag 7224:7300 at the Dallas, TX direct connect location 750-2 customer DX routers 752-2, 754-2 and redistributed into BGP; and the learned prefixes for the site 2 routers 712-2, 714-2 can be mapped to the Low route preference BGP community tag 7224:7100 at the Ashburn, VA direct connect location 750-1 customer DX routers 712-1, 714-1 and redistributed into BGP).

Using the automatic mapping between affinity route preference information and BGP community tag route preference information, symmetric routing between the customer network (e.g., customer data centers/sites 710-1, 710-2) and the DXGW 722/VPCs 738-1, 738-2 of the cloud environment 730 can be implemented and maintained based on using existing affinity failover mechanisms to perform failover to backup direct connect SDWAN routers in case of connectivity issues to the primary routers. And similarly, existing mechanisms with respect to withdrawal of redistributed routes based on BFD being down can be used to perform re-routing the return traffic too via the backup SDWAN routers, thereby preserving traffic symmetry in both directions. Recovery of traffic flows back via the primary direct connect SDWAN routers will also happen via existing mechanisms and traffic symmetry will be preserved.

Figure 8:
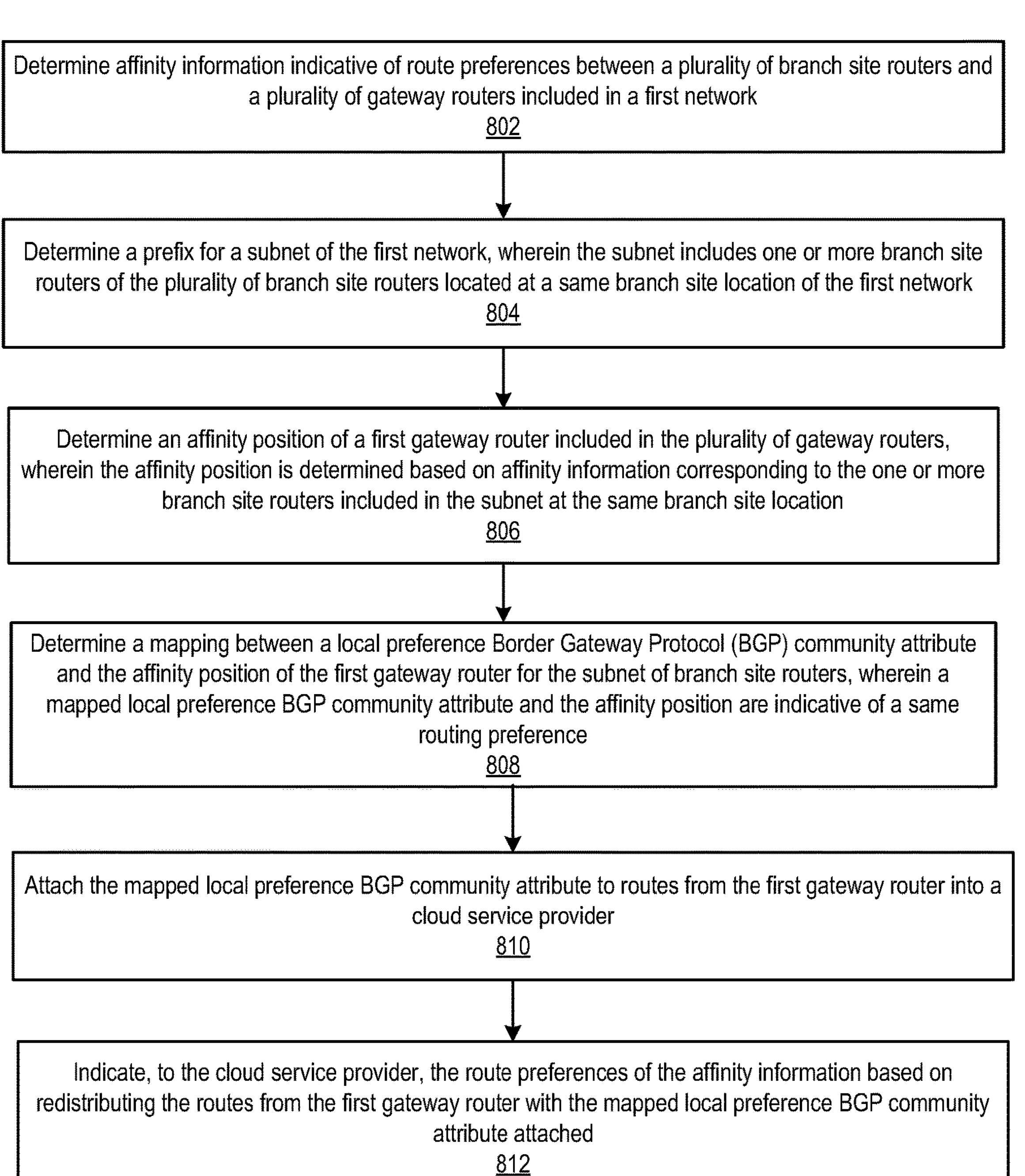
FIG. 8 illustrates a flowchart diagram for a process of wireless communications, in accordance with some aspects of the present technology.

FIG. 8 illustrates a flowchart of an example process 800 for implementing symmetric routing in an SDWAN based on automatically mapping between BGP community tags indicative of route preference information for a cloud service provider network and affinity information indicative of route preference information for an on-premises and/or branch site. It is also understood that the example process 800 of FIG. 8 and/or various other processes described herein can also be implemented using one or more processors and memories having computer-readable instructions stored thereon, which when executed by the one or more processors cause the one or more processors to perform operations including some or all of process 800. Although process 800 depicts a particular sequence of operations, the sequence may be altered without departing from the scope of the present disclosure. For example, some of the operations depicted may be performed in parallel or in a different sequence that does not materially affect the function of process 800. In other examples, different components of an example device or system that implements process 800 may perform functions at substantially the same time or in a specific sequence.

At block 802, the process 800 includes determining affinity information indicative of route preferences between a plurality of branch site routers and a plurality of gateway routers included in a first network. For instance, the affinity information can be indicative of route preferences between a plurality of branch site routers that are the same as or similar to one or more of the branch site routers 615-1, 615-2 of FIG. 6 and/or the branch site routers 712-1, 714-1, 712-2, 714-2 of FIG. 7, and a plurality of gateway routers that are the same as or similar to one or more of the direct connect routers (e.g., gateway routers) 635-1, 635-2 of FIG. 2 and/or the direct connect routers (e.g., gateway routers) 752-1, 754-1, 752-2, 754-2 of FIG. 7. The first network can be a customer network, such as the customer network including Network 1 and Network 2 of sites 610-1 and 610-2, respectively, of FIG. 6 and/or the customer network including sites 710-1, 710-2 of FIG. 7. In some examples, the affinity information can be affinity-preference-order information maintained by each respective one of the customer branch site routers. The affinity information may be OMP Affinity and/or may be based on OMP Affinity.

In some cases, respective affinity information is determined for each respective branch site router of the plurality of branch site routers. The respective affinity information can comprise affinity preference information indicative of a ranked order of route preferences between the respective branch site router and each of the plurality of gateway routers. For example, the respective affinity information can be respective affinity-preference-order information for each branch site router of the plurality of branch site routers. The plurality of branch site routers can be located across a plurality of branch sites of the first network, and the plurality of gateway routers can be located across a plurality of direct connect locations associated with the cloud service provider.

At block 804, the process 800 includes determining a prefix for a subnet of the first network, wherein the subnet includes one or more branch site routers of the plurality of branch site routers located at a same branch site location of the first network. For example, determining the prefix for the subnet can be the same as or similar to determining the prefix 172.16.0.0/24, as described with respect to and depicted in the example of FIG. 7. In some aspects, the prefix is associated with a corresponding subset of the plurality of branch site routers, wherein the subset comprises branch site routers at a same branch site location of the first network.

At block 806, the process 800 includes determining an affinity position of a first gateway router included in the plurality of gateway routers, wherein the affinity position is determined based on affinity information corresponding to the one or more branch site routers included in the subnet at the same branch site location. For example, an affinity position can be determined for a first gateway router that is the same as or similar to the first customer router 615-1 of FIG. 6, where a first affinity information is determined for customer router 615-1 and the site 610-1 and a second affinity information is determined for customer router 615-1 and the site 610-2. In another example, an affinity position can be determined for a first gateway router that is the same as or similar to one or more of the first customer DX routers 752-1, 754-1 of FIG. 7 at the first direct connect location 750-1. A first affinity information can be determined for the first customer DX routers 752-1, 754-1 and the site 710-1 routers of FIG. 7. A second affinity information can be determined for the first customer DX routers 752-1, 754-1 and the site 710-2 routers of FIG. 7.

A third affinity information can be determined for the second customer DX routers 752-2, 754-2 at the second direct connect location 750-2 of FIG. 7. For instance, the third affinity information can be determined for the second customer DX routers 752-2, 754-2 and the site 710-2 routers of FIG. 7. A fourth affinity information can be determined for the second customer DX routers 752-2, 754-2 and the site 710-1 routers of FIG. 7. Each respective affinity information can be different.

At block 808, the process 800 includes determining a mapping between a local preference Border Gateway Protocol (BGP) community attribute and the affinity position of the first gateway router for the subnet of branch site routers, wherein a mapped local preference BGP community attribute and the affinity position are indicative of a same routing preference.

For instance, the local preference BGP community attribute can be a local preference BGP community tag. The local preference BGP community tag can be associated with a route preference indication implementation of the cloud service provider. The cloud service provider can be the same as or similar to the cloud service provider 630 of FIG. 6 and/or the cloud service provider 730 of FIG. 7.

In some examples, the local preference BGP community attribute can be selected from one of: a High preference route preference indication corresponding to a first BGP community, a Medium preference route preference indication corresponding to a second BGP community, or a Low preference route preference indication corresponding to a third BGP community. In some cases, the first BGP community corresponds to a 7224:7300 tag, the second BGP community corresponds to a 7224:7200 tag, and the third BGP community corresponds to a 7224:7100 tag.

In some examples, the mapped local preference BGP community attribute and the affinity position of the first gateway router uniquely correspond to route preferences between the first gateway router and the one or more branch site routers included in the subnet associated with the determined prefix. In some examples, the mapped local preference BGP community attribute and the affinity position are indicative of the same routing preference comprising a rank of the first gateway router relative to the plurality of gateway routers.

At block 810, the process 800 includes attaching the mapped local preference BGP community attribute to routes from the first gateway router into a cloud service provider. For example, the mapped local preference BGP community attribute can be attached to routes from the first direct connect location 750-1 customer DX routers 752-1, 754-1 into the cloud service provider 730 of FIG. 7. In some examples, a different mapped local preference BGP community attribute can be attached to routes from the second direct connect location 750-2 customer DX routers 752-2, 754-2 into the same cloud service provider 730 of FIG. 7.

At block 812, the process 800 includes indicating, to the cloud service provider, the route preferences of the affinity information based on redistributing the routes from the first gateway router with the mapped local preference BGP community attribute attached. For instance, the cloud service provider can be the same as or similar to the cloud service provider 630 of FIG. 6 and/or the cloud service provider 730 of FIG. 7. In some cases, the redistributed routes with the mapped local preference BGP community attribute can be indicated to one or more of the first direct connect location cloud DX routers 757-1, 759-1 of FIG. 7; the second direct connect location cloud DX routers 757-2, 759-2 of FIG. 7; the cloud DXGW 722 of FIG. 7; the VGWs or transit gateways 733-1, 733-2 of FIG. 7; and/or various other network devices and/or entities within cloud environment 730 of FIG. 7 (e.g., cloud environment 730 corresponding to the cloud service provider noted above).

Figure 9:
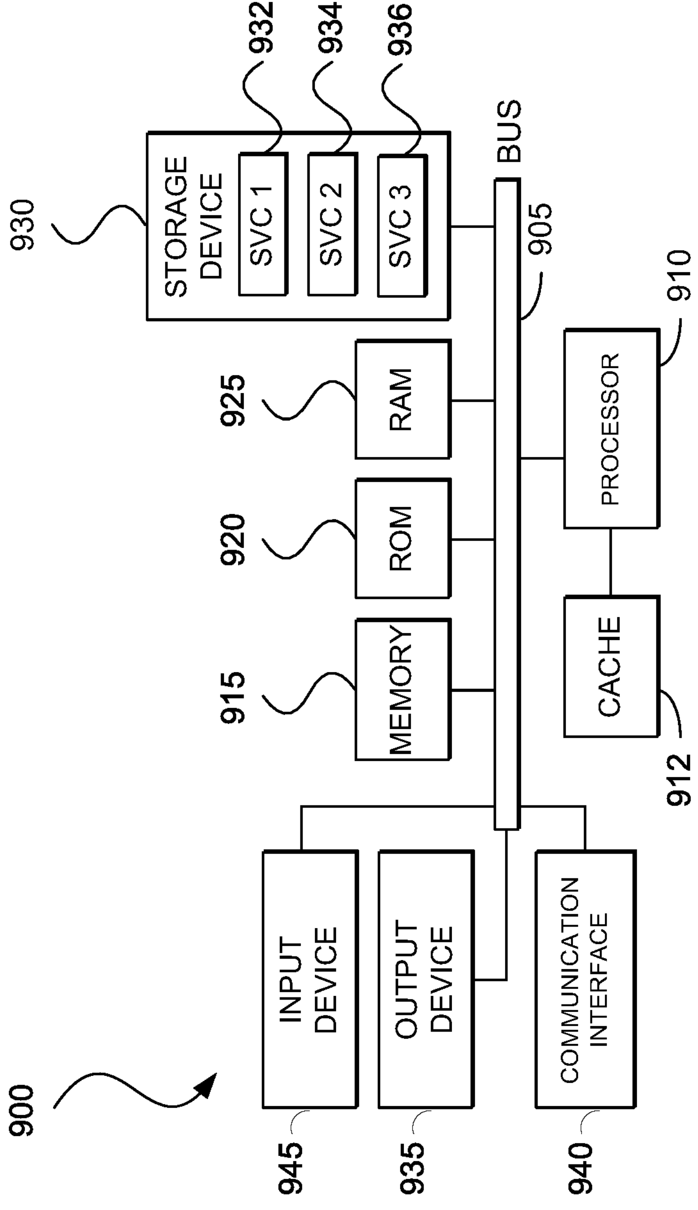
FIG. 9 is a block diagram illustrating an example of a computing system for implementing aspects of the present technology and aspects described herein.

FIG. 9 illustrates a computing system architecture, according to some aspects of the present disclosure. Components of computing system architecture 900 are in electrical communication with each other using a connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

determining affinity information indicative of route preferences between a plurality of branch site routers and a plurality of gateway routers included in a first network;

determining a prefix for a subnet of the first network, wherein the subnet includes one or more branch site routers of the plurality of branch site routers located at a same branch site location of the first network;

determining an affinity position of a first gateway router included in the plurality of gateway routers, wherein the affinity position is determined based on the affinity information corresponding to the one or more branch site routers included in the subnet at the same branch site location;

determining a mapping between a local preference Border Gateway Protocol (BGP) community attribute and the affinity position of the first gateway router for the subnet of branch site routers, wherein a mapped local preference BGP community attribute and the affinity position are indicative of a same routing preference;

attaching the mapped local preference BGP community attribute to routes from the first gateway router into a cloud service provider; and indicating, to the cloud service provider, the route preferences of the affinity information based on redistributing the routes from the first gateway router with the mapped local preference BGP community attribute attached.

2. The method of claim 1, wherein the mapped local preference BGP community attribute and the affinity position of the first gateway router uniquely correspond to the route preferences between the first gateway router and the one or more branch site routers included in the subnet associated with the determined prefix.

3. The method of claim 1, wherein the mapped local preference BGP community attribute and the affinity position are indicative of the same routing preference comprising a rank of the first gateway router relative to the plurality of gateway routers.

4. The method of claim 1, wherein the local preference BGP community attribute is a local preference BGP community tag.

5. The method of claim 1, wherein the local preference BGP community attribute is selected from one of:

a High preference route preference indication corresponding to a first BGP community;

a Medium preference route preference indication corresponding to a second BGP community; or a Low preference route preference indication corresponding to a third BGP community.

6. The method of claim 5, wherein the first BGP community corresponds to a 7224:7300 tag, the second BGP community corresponds to a 7224:7200 tag, and the third BGP community corresponds to a 7224:7100 tag.

7. The method of claim 1, wherein:

respective affinity information is determined for each respective branch site router of the plurality of branch site routers; and the respective affinity information comprises affinity preference information indicative of a ranked order of route preferences between the respective branch site router and each of the plurality of gateway routers.

8. The method of claim 1, wherein the plurality of branch site routers are located across a plurality of branch sites of the first network, and wherein the plurality of gateway routers are located across a plurality of direct connect locations of the cloud service provider.

9. The method of claim 1, wherein the prefix is associated with a corresponding subset of the plurality of branch site routers, and wherein the subset comprises branch site routers at a same branch site location of the first network.

10. A system comprising:

one or more processors; and one or more computer-readable storage media having computer-readable instructions stored thereon, wherein the computer-readable instructions, when executed by the one or more processors, cause the one or more processors to:

determine affinity information indicative of route preferences between a plurality of branch site routers and a plurality of gateway routers included in a first network;

determine a prefix for a subnet of the first network, wherein the subnet includes one or more branch site routers of the plurality of branch site routers located at a same branch site location of the first network;

determine an affinity position of a first gateway router included in the plurality of gateway routers, wherein the affinity position is determined based on the affinity information corresponding to the one or more branch site routers included in the subnet at the same branch site location;

determine a mapping between a local preference Border Gateway Protocol (BGP) community attribute and the affinity position of the first gateway router for the subnet of branch site routers, wherein a mapped local preference BGP community attribute and the affinity position are indicative of a same routing preference;

attach the mapped local preference BGP community attribute to routes from the first gateway router into a cloud service provider; and indicate, to the cloud service provider, the route preferences of the affinity information based on redistributing the routes from the first gateway router with the mapped local preference BGP community attribute attached.

11. The system of claim 10, wherein the mapped local preference BGP community attribute and the affinity position of the first gateway router uniquely correspond to the route preferences between the first gateway router and the one or more branch site routers included in the subnet associated with the determined prefix.

12. The system of claim 10, wherein the mapped local preference BGP community attribute and the affinity position are indicative of the same routing preference comprising a rank of the first gateway router relative to the plurality of gateway routers.

13. The system of claim 10, wherein the local preference BGP community attribute is a local preference BGP community tag.

14. The system of claim 10, wherein the local preference BGP community attribute is selected from one of:

a High preference route preference indication corresponding to a first BGP community;

a Medium preference route preference indication corresponding to a second BGP community; or a Low preference route preference indication corresponding to a third BGP community.

15. The system of claim 14, wherein the first BGP community corresponds to a 7224:7300 tag, the second BGP community corresponds to a 7224:7200 tag, and the third BGP community corresponds to a 7224:7100 tag.

16. The system of claim 10, wherein:

respective affinity information is determined for each respective branch site router of the plurality of branch site routers; and the respective affinity information comprises affinity preference information indicative of a ranked order of route preferences between the respective branch site router and each of the plurality of gateway routers.

17. The system of claim 10, wherein the plurality of branch site routers are located across a plurality of branch sites of the first network, and wherein the plurality of gateway routers are located across a plurality of direct connect locations of the cloud service provider.

18. The system of claim 10, wherein the prefix is associated with a corresponding subset of the plurality of branch site routers, and wherein the subset comprises branch site routers at a same branch site location of the first network.

19. One or more non-transitory computer-readable media comprising computer-readable instructions, which when executed by one or more processors, cause the one or more processors to:

determine affinity information indicative of route preferences between a plurality of branch site routers and a plurality of gateway routers included in a first network;

determine a prefix for a subnet of the first network, wherein the subnet includes one or more branch site routers of the plurality of branch site routers located at a same branch site location of the first network;

determine an affinity position of a first gateway router included in the plurality of gateway routers, wherein the affinity position is determined based on the affinity information corresponding to the one or more branch site routers included in the subnet at the same branch site location;

determine a mapping between a local preference Border Gateway Protocol (BGP) community attribute and the affinity position of the first gateway router for the subnet of branch site routers, wherein a mapped local preference BGP community attribute and the affinity position are indicative of a same routing preference;

attach the mapped local preference BGP community attribute to routes from the first gateway router into a cloud service provider; and indicate, to the cloud service provider, the route preferences of the affinity information based on redistributing the routes from the first gateway router with the mapped local preference BGP community attribute attached.

20. The non-transitory computer-readable media of claim 19, wherein:

the mapped local preference BGP community attribute and the affinity position of the first gateway router uniquely correspond to the route preferences between the first gateway router and the one or more branch site routers included in the subnet associated with the determined prefix; and the mapped local preference BGP community attribute and the affinity position are indicative of the same routing preference comprising a rank of the first gateway router relative to the plurality of gateway routers.

* * * * *